United States Patent
Henry et al.

(10) Patent No.: US 8,347,739 B2
(45) Date of Patent: Jan. 8, 2013

(54) TORQUE SENSING SYSTEM HAVING TORQUE SENSOR, METHOD FOR DETERMINING AN AMOUNT OF TORQUE, AND STEERING SYSTEM

(75) Inventors: Roger C. Henry, Montrose, MI (US); Brian Maust, Unionville, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 315 days.

(21) Appl. No.: 12/878,626

(22) Filed: Sep. 9, 2010

(65) Prior Publication Data
US 2012/0061167 A1  Mar. 15, 2012

(51) Int. Cl.
*G01D 7/00* (2006.01)
(52) U.S. Cl. .................................................. 73/862.046
(58) Field of Classification Search ............. 73/862.041–862.046, 777
See application file for complete search history.

(56) References Cited

U.S. PATENT DOCUMENTS

| | | | | |
|---|---|---|---|---|
| 4,622,751 A | * | 11/1986 | Berg | 33/701 |
| 5,596,153 A | * | 1/1997 | Bulgrien et al. | 73/862.326 |
| 5,827,111 A | * | 10/1998 | Ball | 451/14 |
| 6,629,461 B2 | * | 10/2003 | Behin et al. | 73/514.16 |
| 6,664,711 B2 | * | 12/2003 | Baudendistel | 310/323.02 |
| 6,882,340 B2 | * | 4/2005 | Kanzaki et al. | 345/179 |

* cited by examiner

*Primary Examiner* — Max Noori
(74) *Attorney, Agent, or Firm* — Cantor Colburn LLP

(57) ABSTRACT

A torque sensing system, a torque sensor, a method for determining an amount of torque, and a steering system are provided. The method includes generating a first output signal utilizing a first plurality of piezo-electric transducers disposed between a first plurality of tooth portions of a first hub portion and a second plurality of tooth portions of a second hub portion when the first hub portion is rotated in a first direction relative to the second hub portion. The transducers are electrically coupled in series with one another. The method further includes filtering the first output signal to obtain a first filtered signal and amplifying the first filtered signal to obtain a first amplified signal. The method further includes determining a first torque value indicative of a first amount of torque applied to an input shaft based on the first amplified signal.

18 Claims, 5 Drawing Sheets

TORQUE SENSING SYSTEM HAVING TORQUE SENSOR, METHOD FOR DETERMINING AN AMOUNT OF TORQUE, AND STEERING SYSTEM

FIELD OF THE INVENTION

The subject invention relates to a torque sensing system, a torque sensor, a method for determining an amount of torque, and a steering system for a vehicle using the torque sensing system.

BACKGROUND

Torsion bars have been utilized to measure an applied torque. Torsion bars, however, may add compliance to the steering system. Further, torsions bars are relatively difficult to manufacture.

Accordingly, it is desirable to provide an improved torque sensing system having an improved torque sensor and method for determining an amount of torque.

SUMMARY OF THE INVENTION

In one exemplary embodiment of the present invention, a torque sensor is provided. The torque sensor includes a first hub portion having a first plate member and a first plurality of tooth portions extending therefrom that define a first plurality of gaps therebetween. The first plate member has an aperture extending therethrough configured to receive an input shaft therein. The torque sensor further includes a second hub portion having a second plate member and a second plurality of tooth portions extending therefrom that define a second plurality of gaps therebetween. The second plate member has an aperture extending therethrough configured to receive an output shaft therein. The torque sensor further includes a first plurality of piezo-electric transducers coupled to a first plurality of side surfaces of the second plurality of tooth portions and being electrically coupled in series to one another. The second hub portion is coupled to the first hub portion such that the second plurality of tooth portions are disposed in the first plurality of gaps in the first hub portion. When the first hub portion is rotated in a first direction relative to the second hub portion the first plurality of piezo-electric transducers are compressed between the first and second plurality of tooth portions and generate a first output signal indicative of a first amount of torque being applied to the input shaft.

In another exemplary embodiment of the present invention, a torque sensing system is provided. The torque sensing system includes a torque sensor having a first hub portion, a second hub portion, and a first plurality of piezo-electric transducers. The first hub portion has a first plate member and a first plurality of tooth portions extending therefrom that define a first plurality of gaps therebetween. The first plate member has an aperture extending therethrough configured to receive an input shaft therein. The second hub portion has a second plate member and a second plurality of tooth portions extending therefrom that define a second plurality of gaps therebetween. The second plate member has an aperture extending therethrough configured to receive an output shaft therein. The first plurality of piezo-electric transducers are coupled to a first plurality of side surfaces of the second plurality of tooth portions and are electrically coupled in series to one another. The second hub portion is coupled to the first hub portion such that the second plurality of tooth portions are disposed in the first plurality of gaps in the first hub portion. When the first hub portion is rotated in a first direction relative to the second hub portion the first plurality of piezo-electric transducers are compressed between the first and second plurality of tooth portions and generate a first output signal indicative of a first amount of torque being applied to the input shaft. The torque sensing system further includes a first filter circuit configured to filter the first output signal to obtain a first filtered signal. The torque sensing system further includes a first amplifier circuit configured to amplify the first filtered signal to obtain a first amplified signal. The torque sensing system further includes a computer configured to receive the first amplified signal and to determine a first torque value indicative of the first amount of torque applied to the input shaft based on the first amplified signal.

In another exemplary embodiment of the present invention, a method for determining an amount of torque applied to an input shaft is provided. The method includes generating a first output signal utilizing a first plurality of piezo-electric transducers disposed between a first plurality of tooth portions of a first hub portion and a second plurality of tooth portions of a second hub portion when the first hub portion is rotated in a first direction relative to the second hub portion. The first hub portion is coupled to the input shaft. The first plurality of piezo-electric transducers are electrically coupled in series with one another. The method further includes filtering the first output signal to obtain a first filtered signal utilizing a first filter circuit. The method further includes amplifying the first filtered signal to obtain a first amplified signal utilizing a first amplifier circuit. The method further includes determining a first torque value indicative of a first amount of torque applied to the input shaft based on the first amplified signal utilizing the computer.

In another exemplary embodiment of the present invention, a steering system for a vehicle is provided. The steering system includes an upper steering shaft, a lower steering shaft, and a torque sensor operably coupled to both the upper steering shaft and the lower steering shaft. The torque sensor has a first hub portion with a first plate member and a first plurality of tooth portions extending therefrom that define a first plurality of gaps therebetween. The first plate member has an aperture extending therethrough configured to receive an input shaft therein. The input shaft is coupled to the upper steering shaft. The torque sensor further includes a second hub portion with a second plate member and a second plurality of tooth portions extending therefrom that define a second plurality of gaps therebetween. The second plate member has an aperture extending therethrough configured to receive an output shaft therein. The output shaft is coupled to the lower steering shaft. The torque sensor further includes a first plurality of piezo-electric transducers coupled to a first plurality of side surfaces of the second plurality of tooth portions and being electrically coupled in series to one another. The second hub portion is coupled to the first hub portion such that the second plurality of tooth portions are disposed in the first plurality of gaps in the first hub portion. When the first hub portion is rotated in a first direction relative to the second hub portion, the first plurality of piezo-electric transducers are compressed between the first and second plurality of tooth portions and generate a first output signal indicative of a first amount of torque being applied to the input shaft.

The above features and advantages and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
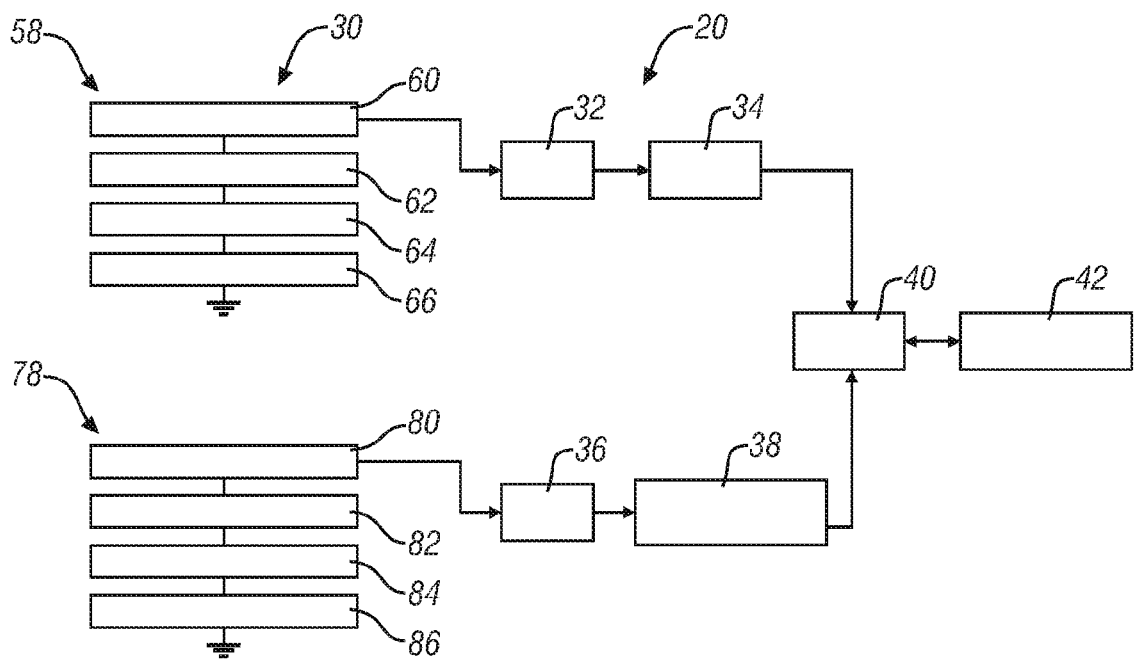
FIG. 1 is a block diagram of a torque sensing system in accordance with the present invention.
Figure 2:
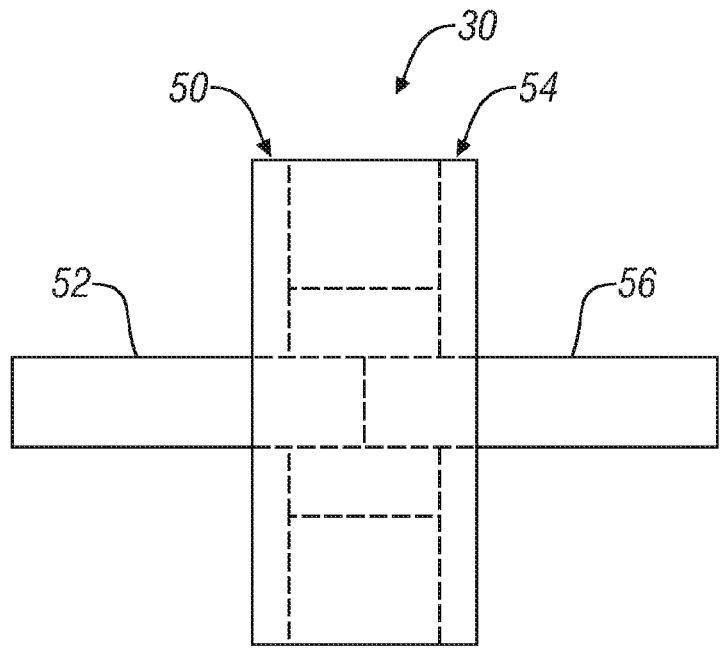
FIG. 2 is a side view of a torque sensor utilized in the torque sensing system of FIG. 1.

Referring to FIGS. 1 and 2, a torque sensing system 20 in accordance with the present invention is illustrated. The torque sensing system 20 includes a torque sensor 30, a filter circuit 32, an amplifier circuit 34, a filter circuit 36, an amplifier circuit 38, a computer 40, and a memory device 42.

The torque sensor 30 is provided to determine an amount of torque applied to an input shaft 52 in both a clockwise direction and a counter-clockwise direction. The torque sensor 30 includes a hub portion 50, an input shaft 52, a hub portion 54, an output shaft 56, a first plurality of piezo-electric transducers 58, and a second plurality of piezo-electric transducers 78. The first plurality of piezo-electric transducers 58 include piezo-electric transducers 60, 62, 64, 66. The second plurality of piezo-electric transducers 78 includes piezo-electric transducers 80, 82, 84, 86.

Figure 3:
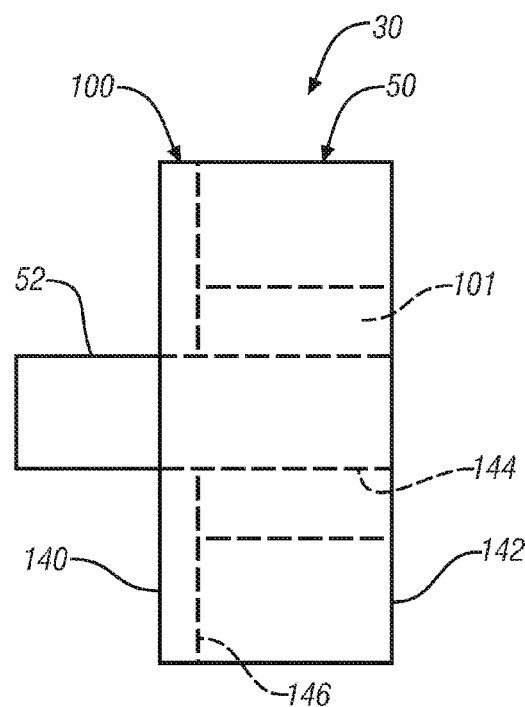
FIG. 3 is a side view of a first hub portion utilized in the torque sensor of FIG. 2.
Figure 4:
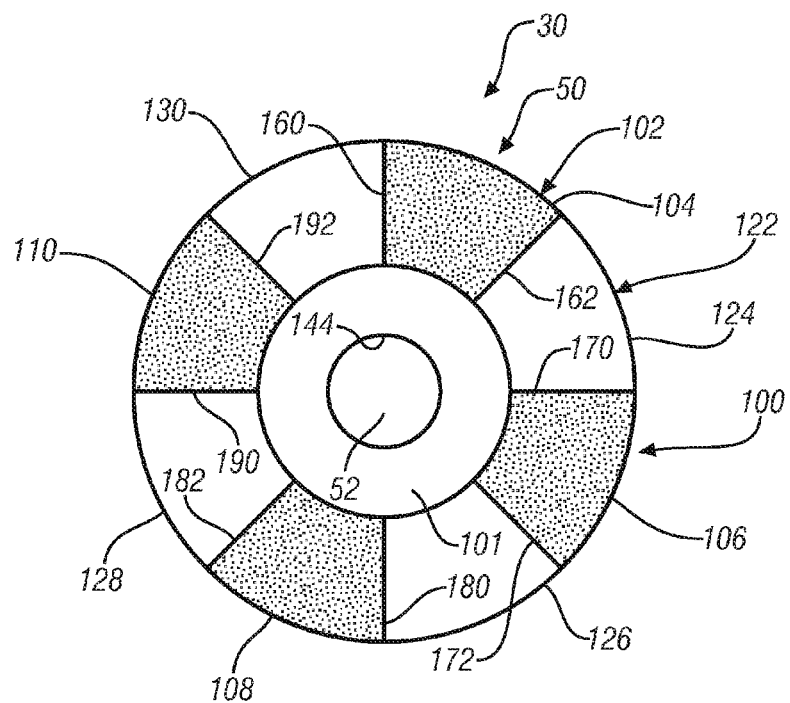
FIG. 4 is a front view of the first hub portion of FIG. 3.

Referring to FIGS. 2-4, the hub portion 50 is configured to be coupled to hub portion 54. Piezo-electric sensors are disposed between the hub portions 50, 54 to generate signals indicative of an amount of torque being applied to the hub portion 50 as will be described in further detail below. The hub portion 50 includes a plate member 100, a ring-shaped member 101, a plurality of tooth portions 102 and a plurality of gaps 122. The plurality of tooth portions 102 includes tooth portions 104, 106, 108, 110. The plurality of gaps 122 includes gaps 124, 126, 128, 130.

The plate member 100 is substantially circular-shaped and is coupled to the ring-shaped member 101. The plurality of tooth portions 102 are disposed circumferentially around the plate member 100 on a surface 146 of the plate member 100 and are spaced apart from one another. Accordingly, the plurality of tooth portions 102 define the plurality of gaps 122 therebetween. For example, a gap 124 is formed between the tooth portions 102, 106, and a gap 126 is formed between the tooth portions 106, 108. Still further, a gap 128 is formed between the tooth portions 108, 110, and a gap 130 is formed between the tooth portions 110, 102. The tooth portion 104 includes side surfaces 160, 162, and the tooth portion 106 includes side surfaces 170, 172. Also, the tooth portion 108 includes side surfaces 180, 182, and tooth portion 110 includes side surfaces 190, 192. Further, the hub portion 50 has an aperture 144 extending through both the plate member 100 and the ring-shaped member 101 for receiving the input shaft 52 therein. The hub portion 50 extends longitudinally from a first end 140 to a second end 142. In the illustrated embodiment, the hub portion 50 is constructed of steel. Of course, other materials known to those skilled in the art could be utilized to construct the hub portion 50.

Figure 5:
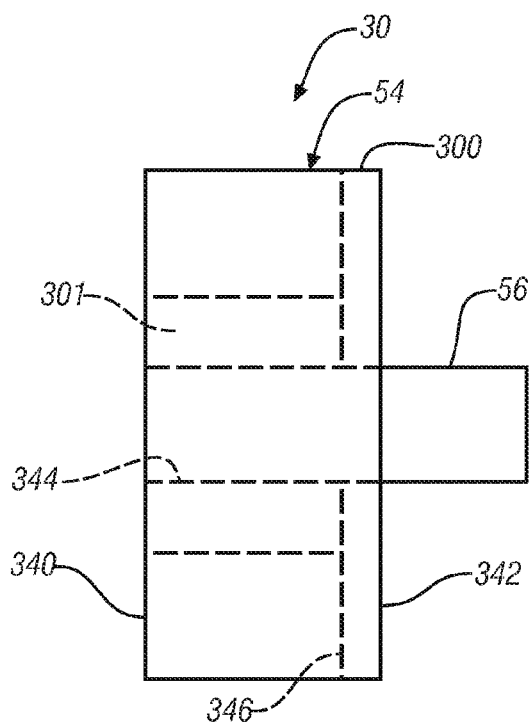
FIG. 5 is a side view of a second hub portion utilized in the torque sensor of FIG. 2.
Figure 6:
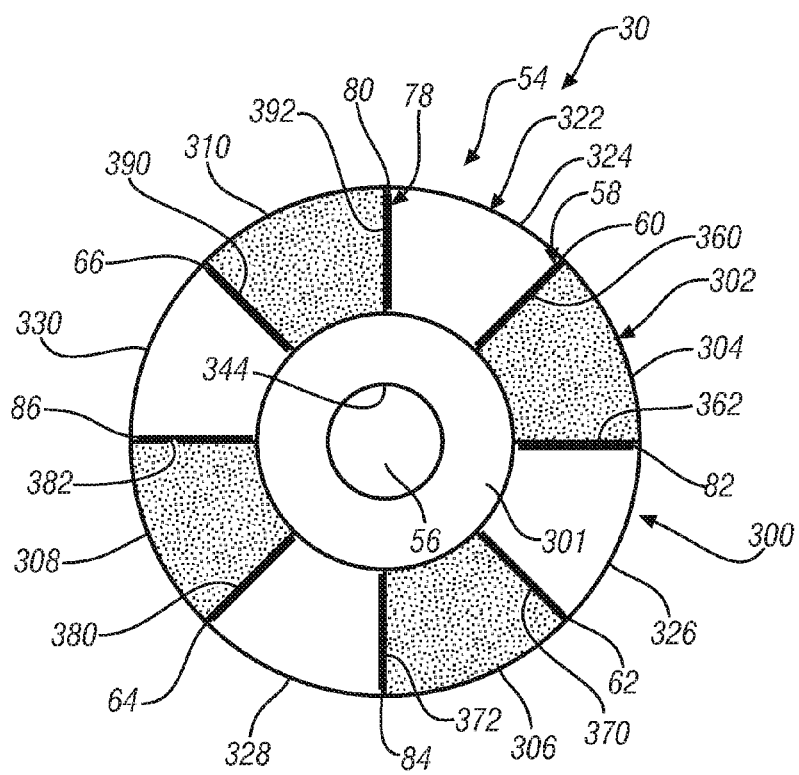
FIG. 6 is a front view of the second hub portion of FIG. 5.

Referring to FIGS. 2, 5 and 6, the hub portion 54 is configured to be coupled to hub portion 50. Piezo-electric sensors are coupled to the hub portion 54 to generate signals indicative of an amount of torque applied to the hub portion 50 as will be described in further detail below. The hub portion 54 includes a plate member 300, a ring-shaped member 301, a plurality of tooth portions 302 and a plurality of gaps 322. The plurality of tooth portions 302 includes tooth portions 304, 306, 308, 310. The plurality of gaps 322 includes gaps 324, 326, 328, 330.

The plate member 300 is substantially circular-shaped and is coupled to the ring-shaped member 301. The plurality of tooth portions 302 are disposed circumferentially around the plate member 300 on a surface 346 of the plate member 310 and are spaced apart from one another. Accordingly, the plurality of tooth portions 302 define the plurality of gaps 322 therebetween. For example, a gap 324 is formed between the tooth portions 310, 304, and a gap 326 is formed between the tooth portions 304, 306. Still further, a gap 328 is formed between the tooth portions 306, 308, and a gap 330 is formed between the tooth portions 308, 310. The tooth portion 304 includes side surfaces 360, 362, and the tooth portion 306 includes side surfaces 370, 372. Also, the tooth portion 308 includes side surfaces 380, 382, and tooth portion 310 includes side surfaces 390, 392. Further, the hub portion 54 has an aperture 344 extending through both the plate member 300 and the ring-shaped member 301 for receiving the output shaft 56 therein. The hub portion 54 extends longitudinally from a first end 340 to a second end 342. In the illustrated embodiment, the hub portion 54 is constructed of steel. Of course, other materials known to those skilled in the art could be utilized to construct the hub portion 54.

Referring to FIGS. 1, 4 and 6, the first plurality of piezo-electric transducers 58 are electrically connected in series to generate an output signal indicative of a clockwise torque applied to the input shaft 52 as viewed from an external end of the input shaft 52. Also, the first plurality of piezo-electric transducers 58 are coupled to a first plurality of side surfaces of the plurality of tooth portions 302 of the hub portion 54. In particular, the piezo-electric transducers 60, 62, 64, 66 are coupled to side surfaces 360, 370, 380, 390, respectively of the tooth portions 302, 306, 308, 310, respectively utilizing an adhesive or other suitable means for attachment. In an alternative embodiment, less than four piezo-electric transducers or greater than four piezo-electric transducers could be utilized to determine a clockwise torque applied to the input shaft 52.

The second plurality of piezo-electric transducers 78 are electrically connected in series to generate an output signal indicative of a counter-clockwise torque applied to the input shaft 52 as viewed from an external end of the input shaft 52. Also, the second plurality of piezo-electric transducers 78 are coupled to a second plurality of side surfaces of the plurality of tooth portions 302 of the hub portion 54. In particular, the piezo-electric transducers 80, 82, 84, 86 are coupled to side surfaces 392, 362, 372, 382, respectively of the tooth portions 310, 304, 306, 308, respectively utilizing an adhesive or other suitable means for attachment. In an alternative embodiment, less than four piezo-electric transducers or greater than four piezo-electric transducers could be utilized to determine a counter-clockwise torque applied to the input shaft 52.

Referring to FIGS. 4 and 6, as discussed above, the hub portion 54 is configured to be coupled to the hub portion 50. The plurality of tooth portions 302 of the hub portion 54 are disposed in the plurality of gaps 122 of the hub portion 50 to couple the hub portions 54, 50 together. In particular, the tooth portions 304, 306, 308, 310 of the hub portion 54 are disposed in the gaps 124, 126, 128, 130, respectively, of the hub portion 50 to couple the hub portions 54, 50 together.

Further, the plurality of tooth portions 102 of the hub portion 50 are disposed in the plurality of gaps 322 of the hub portion 54 to couple the hub portions 50, 54 together. In particular, the tooth portions 104, 106, 108, 110 of the hub portion 50 are disposed in the gaps 324, 326, 328, 330, respectively, of the hub portion 54 to couple the hub portions 50, 54 together.

The first plurality of piezo-electric transducers 58 and the second plurality of piezo-electric transducers 78 are disposed between the plurality of tooth portions 102 of the hub portion 50 and the plurality of tooth portions 302 of the hub portion 54. In particular, regarding the first plurality of piezo-electric transducers 58, the piezo-electric transducer 60 is disposed between the tooth members 304, 104, and the piezo-electric transducer 62 is disposed between the tooth members 306, 106. Also, the piezo-electric transducer 64 is disposed between the tooth members 308, 108, and the piezo-electric transducer 66 is disposed between the tooth members 310, 110. Further, regarding the second plurality of piezo-electric transducers 78, the piezo-electric transducer 80 is disposed between the tooth members 310, 104, and the piezo-electric transducer 82 is disposed between the tooth members 304, 106. Also, the piezo-electric transducer 84 is disposed between the tooth members 306, 108, and the piezo-electric transducer 86 is disposed between the tooth members 308, 110.

The operation of two of the piezo-electric transducers 58, 78 utilized in the system 20 will be now be explained. As discussed above, the piezo-electric transducer 60 is disposed between the tooth members 302, 102. When the input shaft 52 and the hub portion 50 is rotated in a clockwise direction, the piezo-electric transducer 60 is further compressed between the tooth members 302, 102. In response, the piezo-electric transducer 60 generates an output voltage having an amplitude that is: (i) proportional to the compressive force applied by the tooth members 302, 102 to the transducer 60 and (ii) proportional to the torque applied to the input shaft 52. The other piezo-electric transducers 62, 64, 66 electrically coupled in series with the piezo-electric transducer 60 operate in a similar fashion as transducer 60.

The piezo-electric transducer 80 is disposed between the tooth members 310, 104. When the input shaft 52 and the hub portion 50 are rotated in a counter-clockwise direction, the piezo-electric transducer 80 is further compressed between the tooth members 310, 104. In response, the piezo-electric transducer 80 generates an output voltage having an amplitude that is: (i) proportional to the compressive force applied by the tooth members 310, 104 to the transducer 80 and (ii) proportional to the torque applied to the input shaft 52. The other piezo-electric transducers 82, 84, 86 are electrically coupled in series with the piezo-electric transducer 80 operate in a similar fashion as transducer 80.

Referring again to FIG. 1, the filter circuit 32 is configured to receive a cumulative output signal from the piezo-electric transducers 60, 62, 64, 66 and to output a first filtered signal.

As shown, the filter circuit 32 is electrically coupled between the piezo-electric transducer 60 and the amplifier circuit 34. In the illustrated embodiment, the filter circuit 32 is a low pass filter.

The amplifier circuit 34 is configured to receive the first filtered signal from the filter circuit 32 and to amplify the first filtered signal to obtain a first amplified signal. As shown, the amplifier circuit 34 is electrically coupled between the filter circuit 32 and the computer 40.

The filter circuit 36 is configured to receive a cumulative output signal from the piezo-electric transducers 80, 82, 84, 86 and to output a second filtered signal. As shown, the filter circuit 36 is electrically coupled between the piezo-electric transducer 80 and the amplifier circuit 38.

The amplifier circuit 38 is configured to receive the filtered signal from the filter circuit 36 and to amplify the filtered signal to obtain a second amplified signal. As shown, the amplifier circuit 38 is electrically coupled between the filter circuit 36 and the computer 40.

Figure 7:
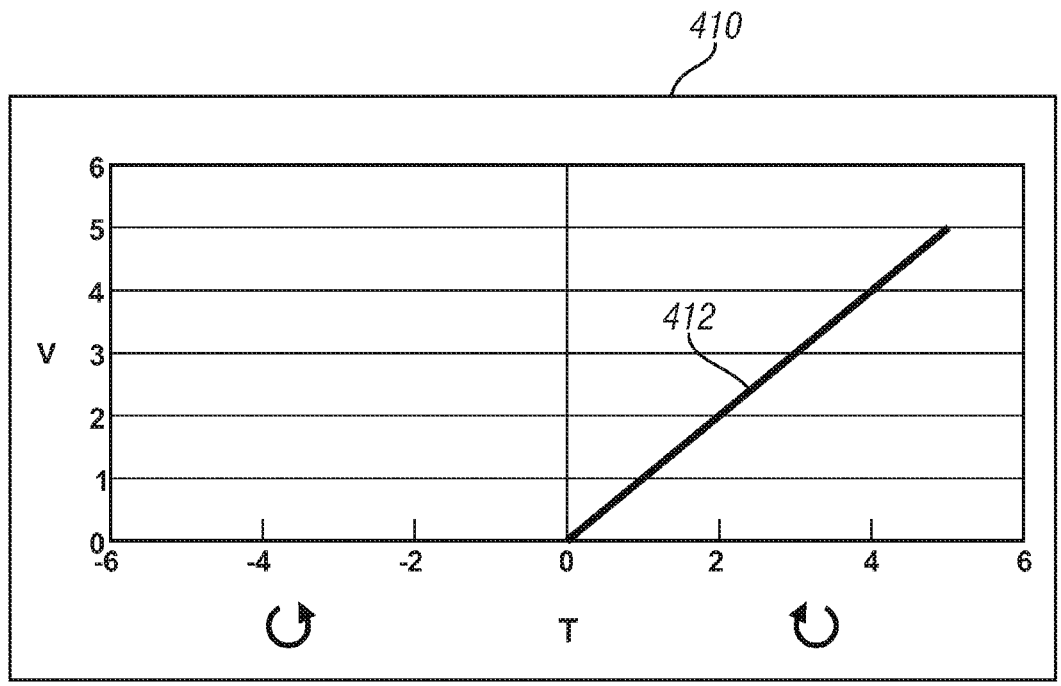
FIG. 7 is a graph of signal curve indicating amounts of torque determined by a first set of piezo-electric transducers in the torque sensing system of FIG. 1.

Referring to FIG. 7, a graph 410 illustrating exemplary voltages output by the piezo-electric transducers 58 of the system 20 will now be explained. In particular, the graph 410 includes a voltage curve 412 indicating the first amplified signal (V) received from the amplifier circuit 34 associated with the first plurality of piezo-electric transducers 58 indicative of torque levels (T) applied to the input shaft 52. The torque applied to the input shaft 52 can either be in a clockwise direction or a counter-clockwise direction.

Figure 8:
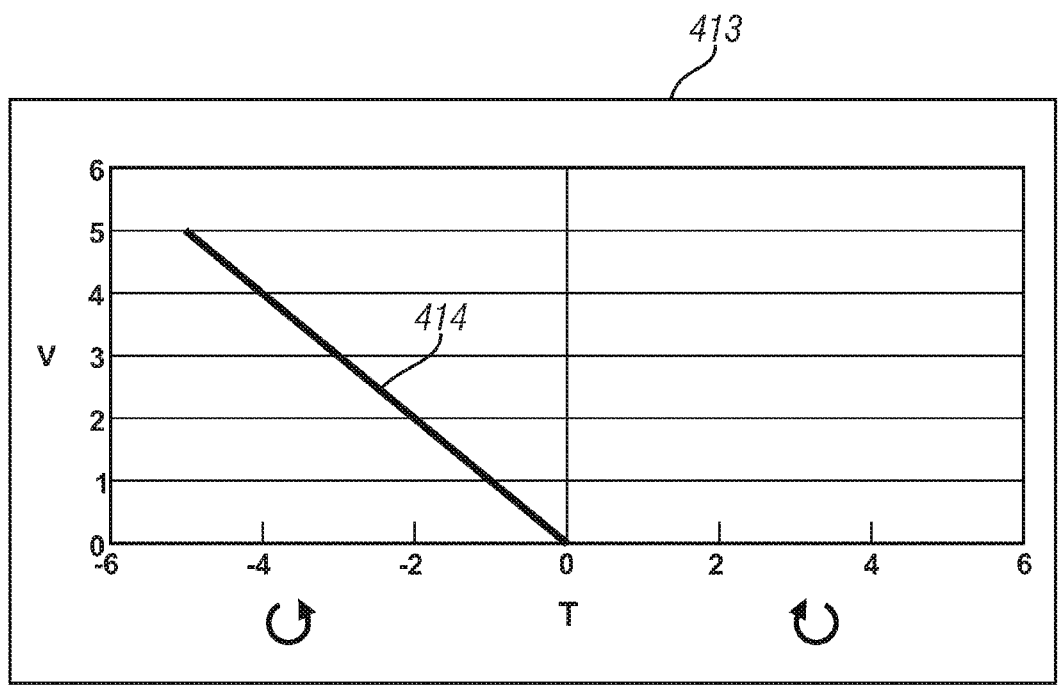
FIG. 8 is a graph of signal curve indicating amounts of torque determined by a second set of piezo-electric transducers in the torque sensing system of FIG. 1.

Referring to FIG. 8, a graph 413 illustrating exemplary voltages output by the piezo-electric transducers 78 of the system 20 will now be explained. In particular, the graph 413 includes a voltage curve 414 indicating the second amplified signal (V) received from the amplifier circuit 38 associated with the second plurality of piezo-electric transducers 78 indicative of torque levels (T) applied to the input shaft 52.

Referring to FIG. 1, the computer 40 is configured to receive the first amplified signal from the amplifier circuit 34 and to determine a first torque value indicative of a first amount of clockwise torque applied to the input shaft 52, based on the first amplified signal. The computer 40 is further configured to receive the second amplified signal from the amplifier circuit 38 and to determine a second torque value indicative of a second amount of counter-clockwise torque applied to the input shaft 52, based on the second amplified signal. Also, the computer 40 is configured to store the torque values in the memory device 42.

Figure 9:
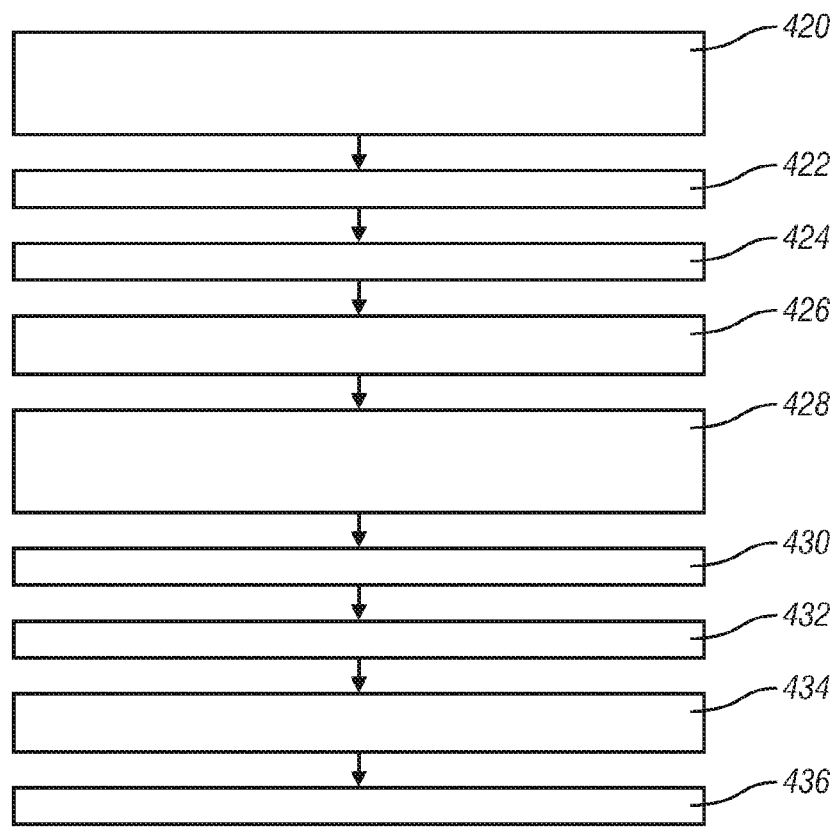
FIG. 9 shows a method for determining an amount of torque in accordance with another aspect of the present invention.

Referring to FIG. 9, a flowchart of a method for determining an amount of torque in accordance with another aspect of the present invention is illustrated. At step 420, the first plurality of piezo-electric transducers 58 disposed between the plurality of tooth portions 102 of the hub portion 50 and the plurality of tooth portions 302 of the hub portion 54 generate a first output signal when the hub portion 50 is rotated in a first clockwise direction relative to the hub portion 54. At step 422, the filter circuit 32 filters the first output signal to obtain a first filtered signal. At step 424, the amplifier circuit 34 amplifies the first filtered signal to obtain a first amplified signal. At step 426, the computer 40 determines a first torque value indicative of a first amount of torque applied to the input shaft 52 based on the first amplified signal. At step 428, the second plurality of piezo-electric transducers 78 disposed between the plurality of tooth portions 102 of the hub portion 50 and the plurality of tooth portions 302 of the hub portion 54 generate a second output signal when the hub portion 50 is rotated in a second counter-clockwise direction relative to the hub portion 54. At step 430, the filter circuit 36 filters the second output signal to obtain a second filtered signal. At step 432, the amplifier circuit 38 amplifies the second filtered signal to obtain a second amplified signal. At step 434, the computer 40 determines a second torque value indicative of a second amount of torque applied to the input shaft 52 based on the second amplified signal. At step 436, the computer 40 stores the first and second torque values in the memory device 42.

Figure 10:
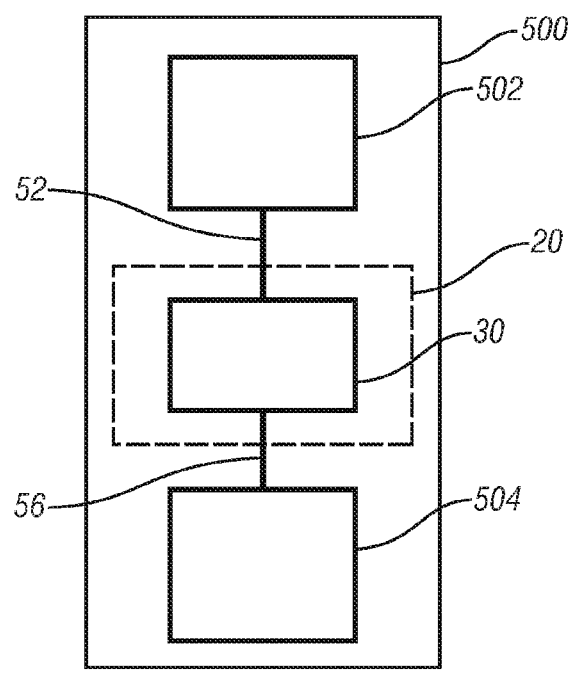
FIG. 10 is a block diagram of a vehicle steering system in accordance with yet another aspect of the present invention.

Referring to FIG. 10, a steering system 500 for a vehicle in accordance with yet another aspect of the present invention is illustrated. The steering system 500 includes an upper steering shaft 502, the torque sensing system 20 including the torque sensor 30, and the lower steering shaft 504. The input shaft 52 of the torque sensor 30 is coupled to the upper steering shaft 502. The output shaft 56 of the torque sensor 30 is coupled to the lower steering shaft 504. When a steering wheel (not shown) coupled to the upper steering shaft 502 rotates the upper steering shaft 502 and the input shaft 52, the torque sensing system 20 determines an amount of torque applied to the upper steering shaft and the input shaft 52.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A torque sensor, comprising:
a first hub portion having a first plate member and a first plurality of tooth portions extending therefrom that define a first plurality of gaps therebetween, the first plate member having an aperture extending therethrough configured to receive an input shaft therein;
a second hub portion having a second plate member and a second plurality of tooth portions extending therefrom that define a second plurality of gaps therebetween, the second plate member having an aperture extending therethrough configured to receive an output shaft therein;
a first plurality of piezo-electric transducers coupled to a first plurality of side surfaces of the second plurality of tooth portions and being electrically coupled in series to one another; and
the second hub portion being coupled to the first hub portion such that the second plurality of tooth portions are disposed in the first plurality of gaps in the first hub portion, and when the first hub portion is rotated in a first direction relative to the second hub portion the first plurality of piezo-electric transducers are compressed between the first and second plurality of tooth portions and generate a first output signal indicative of a first amount of torque being applied to the input shaft.

2. The torque sensor of claim 1, further comprising a second plurality of piezo-electric transducers coupled to a second plurality of side surfaces of the second plurality of tooth portions and being electrically coupled in series to one another, when the first hub portion is rotated in a second direction relative to the second hub portion the second plurality of piezo-electric transducers are compressed between the first and second plurality of tooth portions and generate a second output signal indicative of a second amount of torque being applied to the input shaft.

3. The torque sensor of claim 1, wherein the first hub portion includes the plate member coupled to a ring-shaped member.

4. The torque sensor of claim 1, wherein the first and second hub portions are constructed of steel.

5. A torque sensing system, comprising:
a torque sensor having a first hub portion, a second hub portion, and a first plurality of piezo-electric transducers, the first hub portion having a first plate member and a first plurality of tooth portions extending therefrom that define a first plurality of gaps therebetween, the first plate member having an aperture extending therethrough configured to receive an input shaft therein, the second hub portion having a second plate member and a second plurality of tooth portions extending therefrom that define a second plurality of gaps therebetween, the second plate member having an aperture extending therethrough configured to receive an output shaft therein, the first plurality of piezo-electric transducers coupled to a first plurality of side surfaces of the second plurality of tooth portions and being electrically coupled in series to one another, the second hub portion being coupled to the first hub portion such that the second plurality of tooth portions are disposed in the first plurality of gaps in the first hub portion, and when the first hub portion is rotated in a first direction relative to the second hub portion the first plurality of piezo-electric transducers are compressed between the first and second plurality of tooth portions and generate a first output signal indicative of a first amount of torque being applied to the input shaft;
a first filter circuit configured to filter the first output signal to obtain a first filtered signal;
a first amplifier circuit configured to amplify the first filtered signal to obtain a first amplified signal; and
a computer configured to receive the first amplified signal and to determine a first torque value indicative of the first amount of torque applied to the input shaft based on the first amplified signal.

6. The torque sensing system of claim 5, wherein the first amount of torque is an amount of clockwise torque being applied to the input shaft.

7. The torque sensing system of claim 5, wherein the computer is further configured to store the first torque value in a memory device.

8. The torque sensing system of claim 5, wherein the torque sensor further comprises a second plurality of piezo-electric transducers coupled to a second plurality of side surfaces of the second plurality of tooth portions and being electrically coupled in series to one another, when the first hub portion is rotated in a second direction relative to the second hub portion the second plurality of piezo-electric transducers are compressed between the first and second plurality of tooth portions and generate a second output signal indicative of a second amount of torque being applied to the input shaft.

9. The torque sensing system of claim 8, further comprising:
a second filter circuit configured to filter the second output signal to obtain a second filtered signal;
a second amplifier circuit configured to amplify the second filtered signal and to invert the second filtered signal to obtain a second amplified signal; and
the computer further configured to receive the second amplified signal and to determine a second torque value indicative of a second amount of torque applied to the input shaft based on the second amplified signal.

10. The torque sensing system of claim 9, wherein the second amount of torque is an amount of counter-clockwise torque being applied to the input shaft.

11. The torque sensing system of claim 9, wherein the computer is further configured to store the second torque value in the memory device.

12. A method for determining an amount of torque applied to an input shaft, comprising:

generating a first output signal utilizing a first plurality of piezo-electric transducers disposed between a first plurality of tooth portions of a first hub portion and a second plurality of tooth portions of a second hub portion when the first hub portion is rotated in a first direction relative to the second hub portion, the first plurality of piezo-electric transducers being compressed and are, electrically coupled in series with one another, the first hub portion being coupled to the input shaft;

filtering the first output signal to obtain a first filtered signal utilizing a first filter circuit;

amplifying the first filtered signal to obtain a first amplified signal utilizing a first amplifier circuit; and determining a first torque value indicative of a first amount of torque applied to the input shaft based on the first amplified signal utilizing a computer.

13. The method of claim 12, wherein the first amount of torque is an amount of clockwise torque being applied to the input shaft.

14. The method of claim 12, further comprising storing the first torque value in a memory device utilizing the computer.

15. The method of claim 12, further comprising:

generating a second output signal utilizing a second plurality of piezo-electric transducers disposed between the first plurality of tooth portions of the first hub portion and a second plurality of tooth portions of the second hub portion when the first hub portion is rotated in a second direction relative to the second hub portion, the first plurality of piezo-electric transducers being electrically coupled in series with one another; and filtering the second output signal to obtain a second filtered signal utilizing a second filter circuit;

amplifying the second filtered signal to obtain a second amplified signal utilizing a second amplifier circuit; and receiving the second amplified signal at the computer and determining a second torque value indicative of a second amount of torque applied to the input shaft based on the second amplified signal utilizing the computer.

16. The method of claim 15, wherein the second amount of torque is an amount of counter-clockwise torque being applied to the input shaft.

17. The method of claim 15, further comprising storing the second torque value in a memory device utilizing the computer.

18. A steering system for a vehicle, comprising:

an upper steering shaft;

a lower steering shaft;

a torque sensor operably coupled to both the upper steering shaft and the lower steering shaft, the torque sensor having a first hub portion with a first plate member and a first plurality of tooth portions extending therefrom that define a first plurality of gaps therebetween, the first plate member having an aperture extending therethrough configured to receive an input shaft therein, the input shaft being coupled to the upper steering shaft;

the torque sensor further having a second hub portion with a second plate member and a second plurality of tooth portions extending therefrom that define a second plurality of gaps therebetween, the second plate member having an aperture extending therethrough configured to receive an output shaft therein, the output shaft being coupled to the lower steering shaft;

the torque sensor further having a first plurality of piezo-electric transducers coupled to a first plurality of side surfaces of the second plurality of tooth portions and being electrically coupled in series to one another; and the second hub portion being coupled to the first hub portion such that the second plurality of tooth portions are disposed in the first plurality of gaps in the first hub portion, and when the first hub portion is rotated in a first direction relative to the second hub portion the first plurality of piezo-electric transducers are compressed between the first and second plurality of tooth portions and generate a first output signal indicative of a first amount of torque being applied to the input shaft.

* * * * *